UNITED STATES PATENT OFFICE.

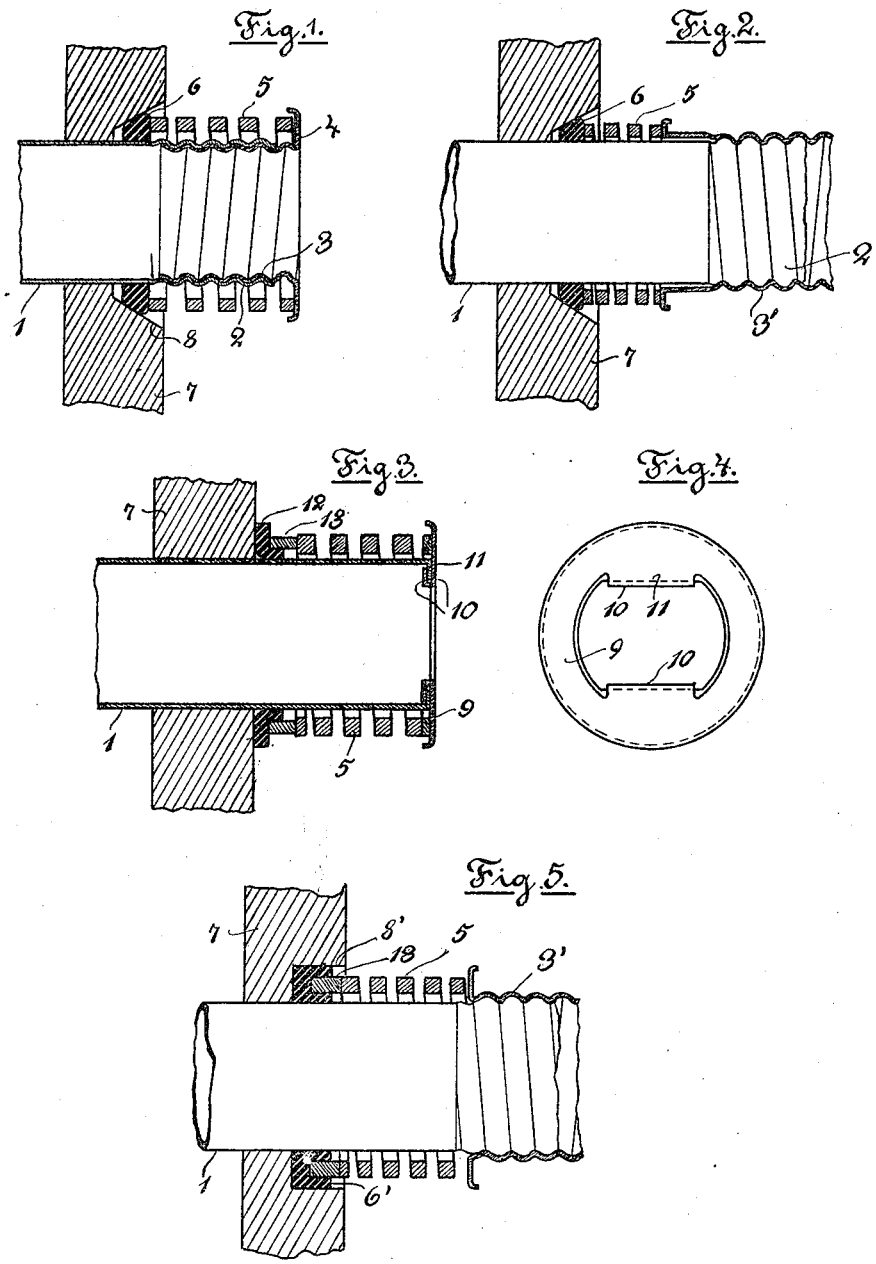

HERMANN BOCK, OF BUCHATZ, OBERSCHLESIEN, GERMANY.

PIPE-PACKING HOLDER.

1,211,061.

Specification of Letters Patent.   Patented Jan. 2, 1917.

Application filed April 16, 1914.   Serial No. 832,293.

*To all whom it may concern:*

Be it known that I, HERMANN BOCK, engineer, of Buchatz, Oberschlesien, Germany, have invented certain new and useful Improvements in Pipe-Packing Holders; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to pipe packings, in condensers and similar heat exchangers. Except the troublesome stuffing box packings, automatic packings are in use which are caused to bear on the packing surface, by the outer excess pressure. The drawbacks of the latter are that the packings at a low internal pressure lose their fluid-tight property owing to expansion of the pipe due to the heat, even when they are prevented from flying off by the packing holders mounted on the pipes.

The present invention resides in the feature that the packing holder bears resiliently on the packing in such a manner that it presses the latter against the packing surface whatever the expansion of the tube due to heat may be, and if there are any inner pressures the holder yields after the manner of safety valves. By adjusting this resiliency in a suitable manner, a complete fluid-tightness of the pipes is warranted up to a certain pressure which can be determined by the aid of a pressure test.

This packing holder acts in a particularly favorable manner when it is mounted in the known manner, not on the tube wall but on the pipe itself. In this case the safety valve spring preferably surrounds the end of the pipe like a coiled spring wound around the latter and can be retained and adjusted by an adjusting nut mounted directly on the pipe, or by a bayonet closure or any other similar retaining and adjusting devices concentric to the tube.

In the accompanying drawings: Figure 1 is a pipe packing holder in which the spring is adapted to be adjusted by a screw. Fig. 2 is a modification thereof. Figs. 3 and 4 show a construction with a bayonet closure for the spring and a sleeve packing, in longitudinal section and end elevation, respectively. Fig. 5 is a construction with a somewhat differently arranged packing.

In carrying the invention into effect as illustrated in Fig. 1 the pipe 1 is formed at the end with a screw-thread 2 of a round section in which an inner nut 3 formed by a sleeve, is adapted to be moved. The latter is provided with an externally projecting flange 4 which causes a coiled spring 5 provided around the pipe, to bear on a packing ring 6 in an adjustable manner, and thus presses the ring against a turned conical packing surface 8 formed in the tube wall 7.

In the second construction shown in Fig. 2, the sleeve-nut is provided externally as an outer nut 3' mounted on the pipe, the remainder of the construction being the same.

In the third construction shown in Fig. 3 the disk-nut on the pipe is in the form of a disk and is adapted to be turned, after the manner of a bayonet connection, the inner face of the disk having projections or lugs 10 which takes over straight portions of an inwardly projecting flange 11 formed on the end of the pipe and thus retains the spring 5 under tension. A flat rubber ring 12 serves as the packing ring in this case the inner diameter of which is less than the outer diameter of the pipe, so that on being slipped over the pipe it bears in a cuff-like manner partly upon the tube wall 7 and partly upon the pipe 1. In this position it is retained by the ring 13 holding the packing in place and is loaded by the spring.

In the last construction according to Fig. 5, an external nut 3' like that used in the construction shown in Fig. 2 is used and the packing ring 6' in this case, is a ring of approximately quadrilateral cross-section bearing in a not conical but cylindrical milled recess 8' formed in the tube wall 7. In all cases, however, either of the two packing holders of a pipe may be rigid or immovable by dispensing, for instance, with the spring of the second constructional form. A movement of the pipe and a restriction of the expansions due to heat is out of question just like when using packing holders resilient on both sides. The springs may be made from rust proof steel or from any other suitable material.

What I claim is:

1. In a pipe packing, the combination of a pipe having a threaded end portion, an annular packing member surrounding the pipe, a nut engaging said threads, and a coiled spring surrounding the pipe, interposed between and bearing on the packing and a flange on one end of the nut, whereby the tension of the spring may be regulated.

2. In a pipe packing, the combination of a tube wall having a tube aperture formed with a conical face, a tube projecting through said aperture having an internally threaded end portion, a nut having external threads engaging said internally threaded portion, a packing ring seated on said face, and a coiled spring surrounding the pipe between and bearing on the ring and a flange formed on the end of the nut whereby the tension of the spring may be regulated.

In testimony that I claim the foregoing as my invention, I have signed my name in presence of two subscribing witnesses.

HERMANN BOCK.

Witnesses:
ERWIN WESNIZK,
MARGARETE KRIEG.

Copies of this patent may be obtained for five cents each, by addressing the "Commissioner of Patents, Washington, D. C."